United States Patent
Pecnik et al.

(10) Patent No.: US 6,880,664 B2
(45) Date of Patent: Apr. 19, 2005

(54) ALL-WHEEL DRIVE VEHICLE WITH HYBRID DRIVE

(75) Inventors: Hermann Pecnik, Nestelbach (AT); Helmut Stelzl, Leutschach (AT)

(73) Assignee: Magna Steyr Fahrzeugtechnik AG& Co. KG, Graz (AT)

( * ) Notice: Subject to any disclaimer, the term of this patent is extended or adjusted under 35 U.S.C. 154(b) by 0 days.

(21) Appl. No.: 10/438,509

(22) Filed: May 15, 2003

(65) Prior Publication Data

US 2003/0234124 A1 Dec. 25, 2003

(30) Foreign Application Priority Data

May 17, 2002 (AT) ...................................... GM317/2002

(51) Int. Cl.[7] .............................................. B60K 6/02
(52) U.S. Cl. ..................................................... 180/243
(58) Field of Search ............................... 180/233, 242, 180/243

(56) References Cited

U.S. PATENT DOCUMENTS 6,041,877 A * 3/2000 Yamada et al. ............. 180/65.2
6,464,608 B1 * 10/2002 Bowen et al. .................. 475/5
2003/0136597 A1 * 7/2003 Raftari et al. ................ 180/242

* cited by examiner

Primary Examiner—Kevin Hurley
(74) Attorney, Agent, or Firm—Bachman & LaPointe, P.C.

(57) ABSTRACT

An all-wheel drive with hybrid drive has an internal combustion engine (1), a first drive train (4) for a first driven axle (2), a second drive train (10) for a second driven axle (3), an electric machine (15) in the second drive train (10; 110), and a first clutch (20) upstream of the electric machine (15) and a second clutch (21) downstream of the electric machine (15). In order to improve all the electrical functions and to provide an all-wheel drive which meets all requirements, the electric machine (15) is composed of a stator (17) and of a rotor (18) which is connected to a first element (44) of a three-element planetary gear mechanism (19), whose second element (45) is connected to the first clutch (20) and whose third element (46) is connected to the second clutch (21).

8 Claims, 4 Drawing Sheets

ALL-WHEEL DRIVE VEHICLE WITH HYBRID DRIVE

BACKGROUND OF THE INVENTION

The invention relates to all-wheel drive vehicles with a hybrid drive, which comprises an internal combustion engine, a first drive train for a first driven axle, a second drive train for a second driven axle, an electric machine (which may operate either as an engine or as a generator in order to charge an accumulator) in the second drive train, and a first clutch upstream of the electric machine and a second clutch downstream of the electric machine. The first clutch is thus at the internal combustion engine end and the second clutch at the second driven axle end.

A drive of the generic type is known from DE 196 39 904 A1. It permits the following operating modes: driving with electromotive, internal combustion engine-powered or hybrid drive, regenerative braking and charging in the various drive modes, all-wheel drive or drive with only one axle. However, as a result of the fact that the second drive train connects the two drive axles rigidly when the clutches are closed, the situation in the all-wheel drive mode is as if there were no differential between the two axles, and it is therefore not possible to travel around bends.

Further disadvantages of this known drive are due to the fact that the electric machine rotates essentially with the rotational speed of the articulated shaft, and in fact somewhat faster in the variant with a step-down gear mechanism, the rotational speed always being proportional to the travel speed. Thus, during slow travel with the electric drive (that is to say when it is needed the most), sufficient torque is not available and no significant generator effect is available during charging or during regenerative braking when traveling slowly.

DE 44 01 473 A1 discloses a power transmission unit which is arranged in the drive train for the second driven axle, rotates in its entirety and in which a three-element planetary gear mechanism and an electric brake or an eddy current brake are provided. As a result, even though the torque or the rotational speed which is transmitted to the second axle can be regulated, the output variables (torque and/or speed) of this unit can never be greater than the input variables. There is no mention of regenerative braking, let alone of a contribution to the drive.

An object of the invention is to develop a hybrid drive of the generic type in such a way that, as well as improving all the electric functions (drive, charging, regenerative braking), an all-wheel drive which meets all requirements is also provided. These requirements also comprise complete roadworthiness and ABS and ESP compatibility with the permanent all-wheel drive.

SUMMARY OF THE INVENTION

The foregoing object is achieved according to the invention wherein an electric machine is composed of a housing which forms the stator and of a rotor which is connected to a first element of a three-element planetary gear mechanism, whose second element is connected to the first clutch and whose third element is connected to the second clutch.

The planetary gear mechanism firstly forms a connection to the rotor with a high transmission ratio. As a result, its rotational speed can be a multiple of the rotational speed of the drive train and it is not necessarily proportional. It can be regulated by actuating the electric machine (in particular by means of its stator windings). The electric machine is significantly smaller by virtue of its rotational speed level which is generally much higher. Consequently, even when traveling slowly, a high braking torque is available, and in the case of an electric drive a high torque is available. The latter is particularly desired in town cycle driving.

The connection of the other elements of the planetary gear mechanism to the clutches makes it possible for the rotational speed at the second clutch to be lower, and at most the same, controlled by means of the braking torque which is applied by the electric machine. Thus, when the wheels of the first driven axle spin, a higher torque can be allocated to the wheels of the second driven axle, in accordance with the grip conditions.

Furthermore, it is however also possible to operate the electric machine as a motor, making it possible to drive the second driven axle more quickly than the first driven axle. In this case, the planetary gear mechanism acts as a variable ratio planetary gear mechanism, as a result of which a higher torque can be made available to the second driven axle than to the first. This is very valuable in certain driving situations, for example in order to bring about intentional oversteering.

In an advantageous development of the invention, the first and second clutches each have two shift positions, in one of which they connect an element of the planetary gear mechanism to the respective connecting part of the second drive train and in the other of which they connect the same element to the housing. In the first position, both axles are driven and in the second the transmission ratio of the planetary gear mechanism is a higher one as a result of the connection of one element or the other to the housing, said higher transmission ratio benefiting, in the one case, operation with electric drive with only the second axle, and in the other case benefiting the charging operation.

In one particularly favorable configuration of the planetary gear mechanism, the first element is the sunwheel, the second element the planetary carrier and the third element the ring gear, the sunwheel and the rotor of the electric machine being seated on a common hollow shaft, and the electric machine and the planetary gear mechanism are accommodated in a common housing to which in each case one clutch is connected on each side.

The embodiment according to the invention is suitable for a wide variety of all-wheel drive systems: in the conventional arrangement with a central transfer transmission—which then requires, no differential—the electric machine can be arranged with the planetary gear mechanism in one of the two drive trains. In the case of an arrangement in which the first drive train leads to the permanently driven first axle (usually the front axle) and the second drive train leads to the second driven axle via an articulated shaft, the electric machine is advantageously arranged between the articulated shaft and an axle transmission of the second driven axle.

A particularly economical development which is favorable for the distribution of weight is that the electric machine with the planetary gear mechanism and the clutches directly adjoins the axle transmission and their housings are connected to one another or joined.

If the first driven axle has an axle transmission and two half axles which lead to the wheels, a possible development of the invention is that a third clutch is provided in one of the two half axles. Such an arrangement makes it possible to operate the electric machine as a generator even when the vehicle is stationary if this third clutch is open. Then the differential of the axle transmission in fact "differentiates", with the result that the torque is passed on to the electric machine without driving the vehicle.

BRIEF DESCRIPTION OF THE DRAWINGS

The invention is described and explained below with reference to figures, in which.

DETAILED DESCRIPTION

Figure 1:
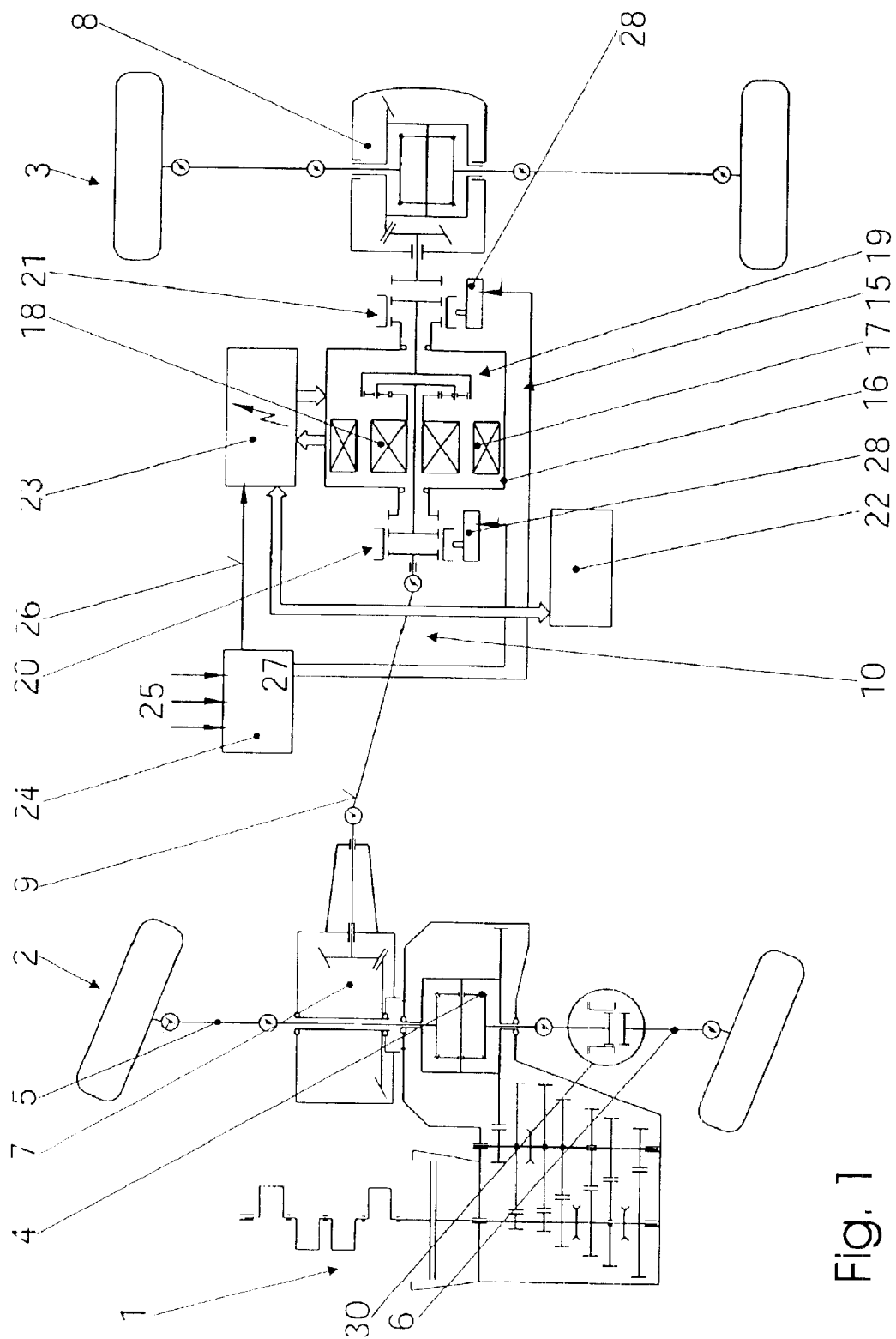
FIG. 1: shows a diagram of a vehicle with the drive according to the invention.

In FIG. 1, the engine transmission block of an all-wheel drive vehicle according to the invention is designated by 1, the first driven axle, here the front axle, is designated by 2 and the second driven axle (here the rear axle) by 3. The first driven axle 2 has an axle transmission 4 with differential between a first half axle 5 and a second half axle 6, with respect to which differential the first drive train is degenerated in the arrangement shown. Said drive train is adjoined by an angle transmission 7 which forms the output of the second drive train 10 which leads to an axle transmission 8 with differential of the second driven axle and is formed by an articulated shaft 9 and a device according to the invention.

This device according to the invention is composed of an electric machine 15 and a planetary gear mechanism 19 which is also accommodated in the housing 16 together with a stator winding 17 and a rotor 18 of the electric machine. The housing 16 and the stator winding 17 are fixed to the vehicle, that is to say they do not rotate. A first clutch 20 is provided upstream of the housing 16, and a second clutch 21 downstream of the housing 16. These clutches may be claw-type or sleeve-type clutches with or without synchronization. Other clutch types, such as for example multiplate clutches, are also conceivable.

The stator winding 17 is connected to an accumulator battery 22 via a corresponding power electronic system 23. A control electronic system 24 acquires control signals 26, from various driving and operating data 25, for the power electronic system 23 and for controlling the clutches 20, 21 which have actuators 28, 29. Finally, it is also possible to provide a third clutch in the second half axle 6 of the first driven axle, on which clutch more details will be given later.

Figure 2:
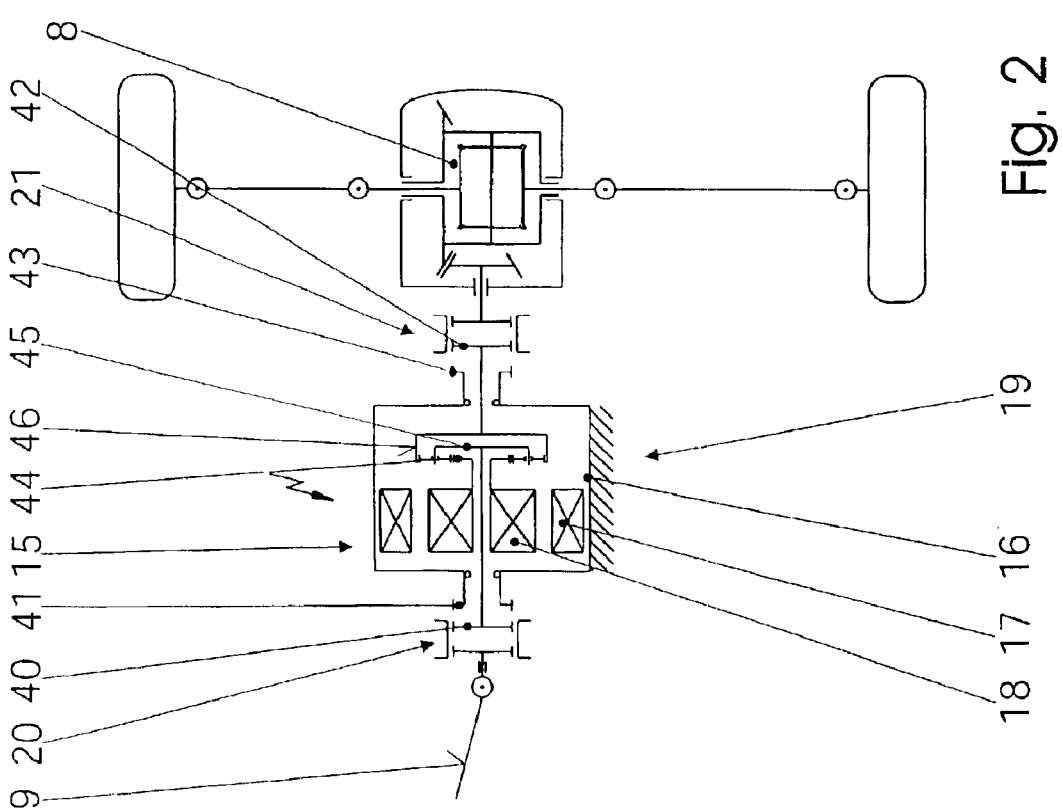
FIG. 2: shows a detail of FIG. 1 in a first operating mode.

FIG. 2 shows only the electric machine 15 with the adjacent elements in a specific operating position. The elements which adjoin the electric machine 15 are, apart from the planetary gear mechanism 19, the two clutches 20, 21. The first clutch 20 has two different clutch positions. In the first clutch position it connects the articulated shaft 9 to a first clutch hub 40 and in the second position it connects the first clutch hub 40 to a first housing hub 41. The second clutch 21 also has two positions. In the first it connects the rest of the second drive train 10, specifically the axle transmission 8, to a second clutch hub 42, and in the other position it connects the latter to a second housing hub 43.

The planetary gear mechanism 19 is composed of a sunwheel 44 which is connected fixed in terms of rotation to the rotor 18 of the electric machine 15 and forms a hollow shaft with the latter, of a planetary carrier 45 which penetrates the rotor 18 and its hollow shaft and is connected fixed in terms of rotation to the first clutch hub 40, and of a ring gear 46 which is connected fixed in terms of rotation to the second clutch hub 42.

In the operating state shown in FIG. 2, the first clutch 20 connects the planetary carrier 45 fixed in terms of rotation to the articulated shaft 9, and the second clutch 21 connects the ring gear 46 to the drive of the second axle differential 8. This means that the connection between the two driven axles 2, 3 is made via the planetary gear mechanism. In order to transmit a torque, one of the elements of the planetary gear mechanism 19 must be supported. This support is provided by the electric machine 15 which acts in this case as a brake. As the braking force which is exerted by it can be controlled by means of the power electronics 23, it is also the supporting force in the planetary gear mechanism and thus also the torque which is transmitted to the second driven axle, as long as the rotational speed of the ring gear 46 is only less than that of the planetary carrier 45, or as long as the rotational speed of the second driven axle 3 is less than that of the first driven axle 2. This thus results in the effect of a controllable clutch between the driven axles and thus of a control of the distribution of the torque between them.

However, as the electric machine is not only a brake generator but also an electric motor, it can also transmit a higher torque through corresponding actuation of the second driven axle 3, and increase its rotational speed beyond that of the first driven axle. The planetary gear mechanism acts as a variable ratio planetary gear mechanism here.

Figure 3:
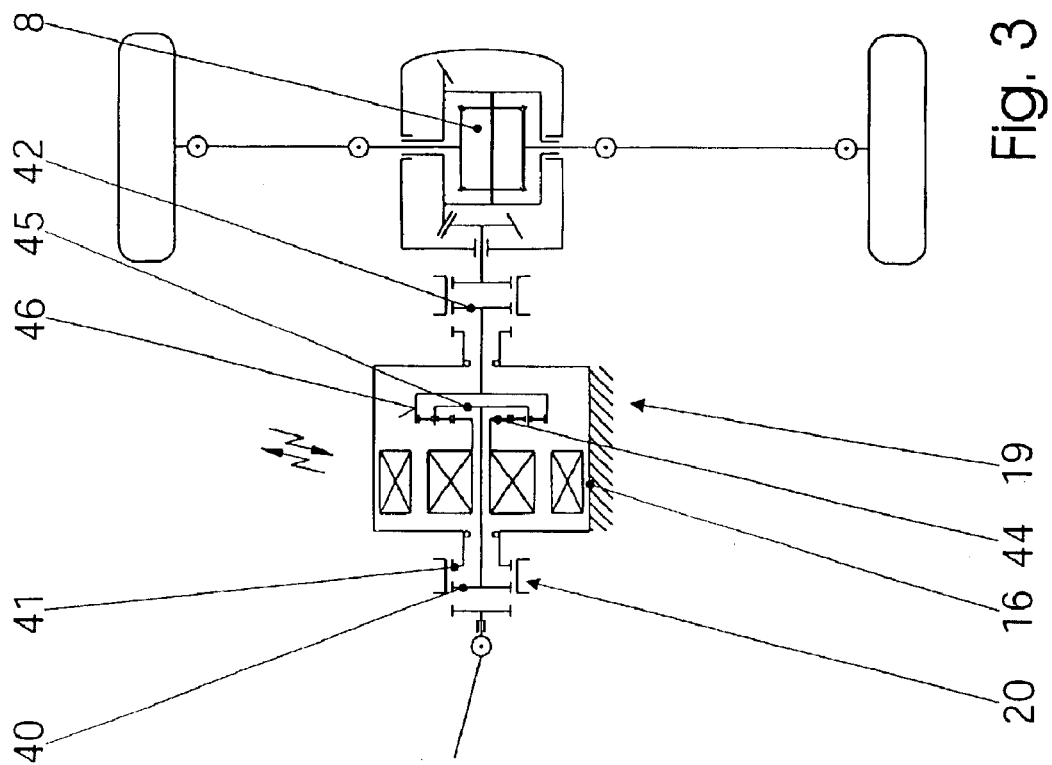
FIG. 3: shows a detail of FIG. 1 in a second operating mode.

In FIG. 3, the first clutch 20 is moved into the other shift position in which it connects the first clutch hub 40 fixed in terms of rotation to the first housing hub 41. The planetary carrier 45 is then connected fixed in terms of rotation to the housing 16. The planetary gear mechanism 19 thus becomes a fixed-shaft transmission in which the ring gear 46, the sunwheel 44 and with it the rotor 18 of the electric machine rotates very quickly. In this shift position, two operating states are possible. In one, the second driven axle drives the electric machine, which thus acts as a generator, that is to say regenerative braking; and in the second the electric machine 15 acts as a motor which drives only the second driven axle with a very large transmission ratio. This results in a high acceleration when the speed is low and there is good grip (town cycle in which all-wheel drive is not required). Thus, it is possible to travel with the internal combustion engine switched off, that is to say purely by electric means.

Figure 4:
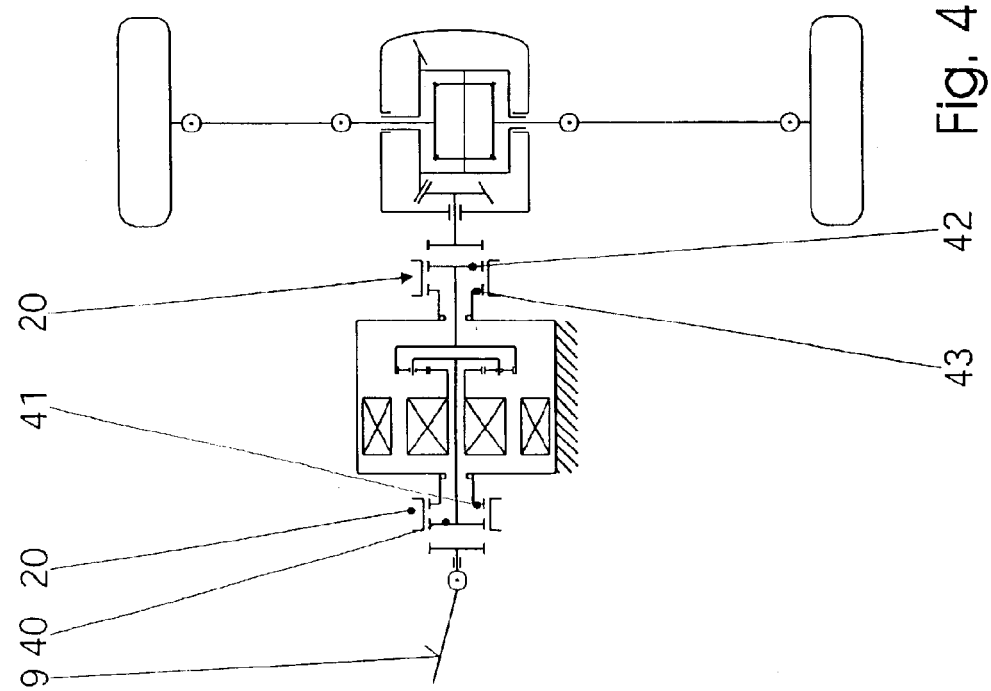
FIG. 4: shows a detail of FIG. 1 in a third operating mode.
Figure 6:
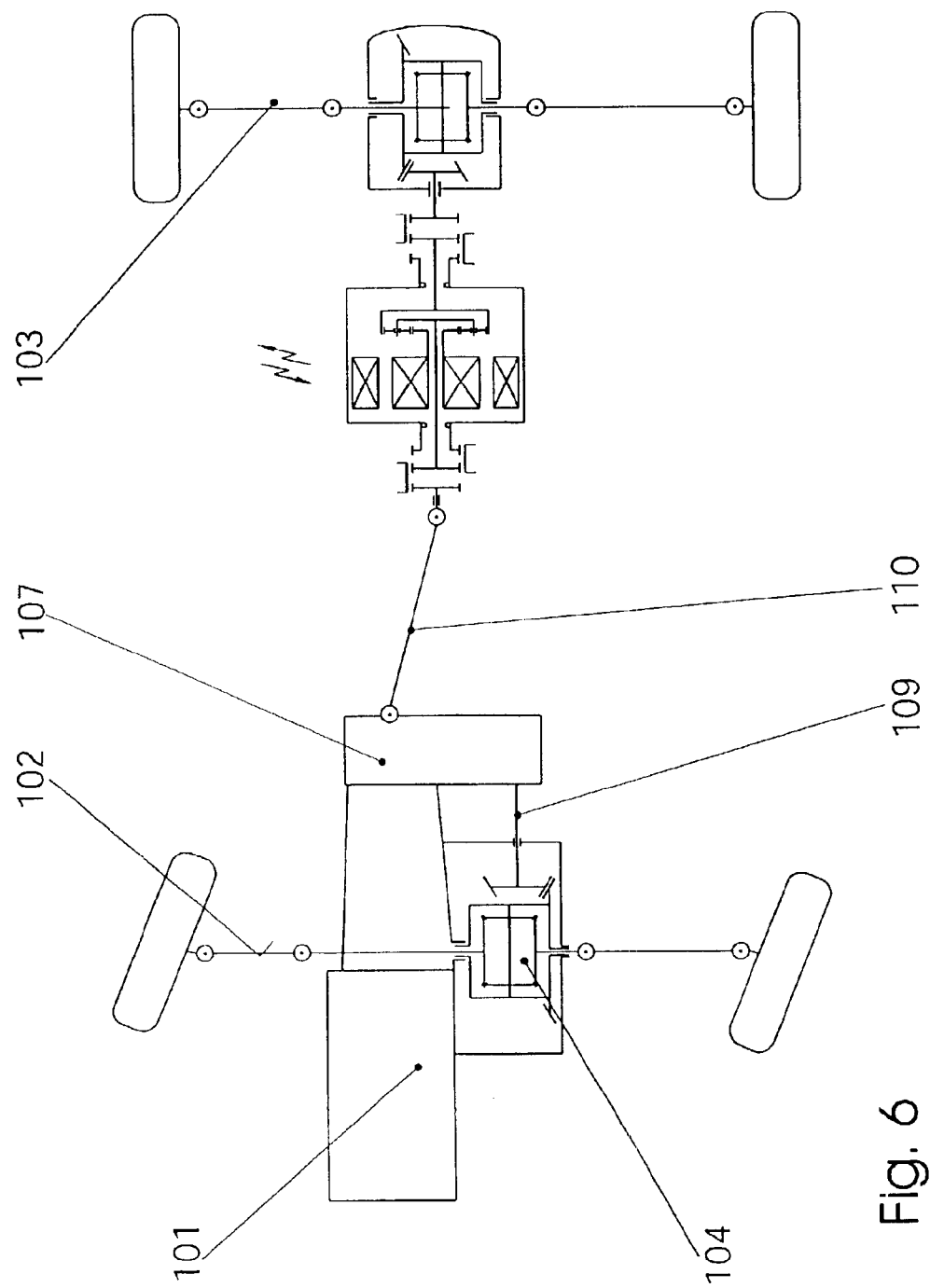
FIG. 6: shows a diagram of a different embodiment.

In FIG. 4, both clutches 20, 21 are in the position in which they connect the clutch hub 40, 42 fixed in terms of rotation to the housing hub 41, 43. The electric machine is thus completely blocked. In this operating state, the vehicle normally travels with the internal combustion engine and with only the first driven axle being driven.

Figure 5:
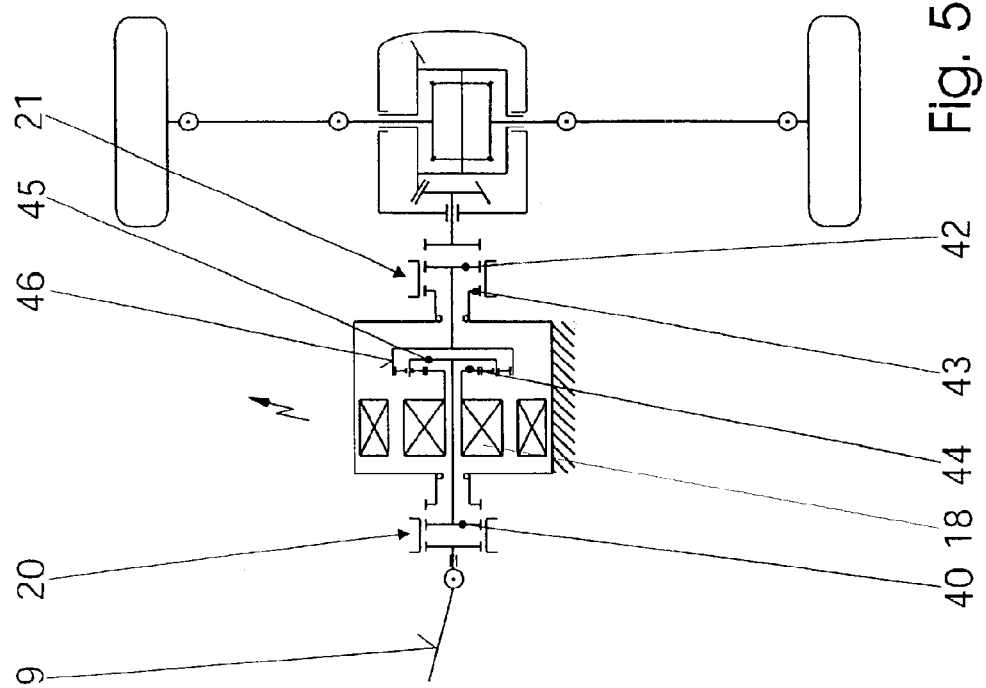
FIG. 5: shows a detail of FIG. 1 in a fourth operating mode.

In the operating state in FIG. 5, the first clutch is in the position in which the first clutch hub 40 is connected fixed in terms of rotation to the articulated shaft 9, and thus to the first driven axle 2, and fixed in terms of rotation to the internal combustion engine. The second clutch 21 blocks the second clutch hub 42 with respect to the second housing hub 43, and the ring gear 46 of the planetary gear mechanism 19 is stationary. Owing to the position of the first clutch 20, the planetary carrier 45 is driven when the vehicle travels. As its planetary wheels roll on the ring gear 46, the sunwheel 44 rotates, and the rotor 18 of the electric machine 15 rotates with it very quickly.

In this clutch configuration there are also two operating states again, in each case only with the first driven axle, and the second axle is not driven. In the first operating state, the electric machine 15 acts as a motor which supports the internal combustion engine, with a high step-down ratio, as the first driven axle is driven. In the second operating state, the electric machine 15 acts as a generator. It thus uses up the power of the internal combustion engine which is instantaneously not required for the drive in order to generate current which is stored in the accumulator battery 22 (FIG. 1). The internal combustion engine can thus be operated in its most favorable range.

If it is also desired to charge the accumulator battery in the stationary state on the basis of this operating state, this is possible by opening the clutch 30 (shown in FIG. 1) in the half axle 6 of the first driven axle. Owing to the axle transmission 4, the other half axle 5 is not driven, but rather only the second drive train 9, and thus the electric machine which operates as a generator. The generator operation when the vehicle is stationary can also be used to supply electrical loads which are not actually associated with the vehicle itself.

FIG. 7 shows a quite different embodiment of the invention. Here, the second drive train 110 for the second driven axle together with everything in between does not differ at all from the embodiment in FIG. 1. The difference is that the engine-transmission block 101 is arranged in the longitudinal direction of the vehicle here and is followed by a rigid transfer transmission, that is to say one without a central differential, from which a first drive train 109 extends to the first driven axle 102, and the known second drive train 110 extends to the second driven axle 103. However, within the scope of the invention, the two drive trains can also be exchanged, that is to say 109 can take the place of 110, and vice versa.

What is claimed is:

1. An all-wheel drive vehicle with hybrid drive, comprising an internal combustion engine (1), a first drive train (4; 109) for a first driven axle (2; 102), a second drive train (10; 110) for a second driven axle (3; 103), an electric machine (15) in the second drive train (10; 110), and a first clutch (20) upstream of the electric machine as well as a second clutch (21) downstream of the electric machine, wherein the electric machine (15) is composed of a housing (16) which forms the stator (17) and of a rotor (18) which is connected to a first element (44) of a three-element planetary gear mechanism (19), whose second element (45) is connected to the first clutch (20) and whose third element (46) is connected to the second clutch (21).

2. The all-wheel drive vehicle with hybrid drive as claimed in claim 1, wherein the first clutch (20) and the second clutch (21) each have two shift positions, in one of which they connect an element (45, 46) of the planetary gear mechanism (19) to the respective connecting part of the second drive train (9) and in the other of which they connect the same element (45, 46) to the housing (16).

3. The all-wheel drive vehicle with hybrid drive as claimed in claim 2, wherein the first element (44) of the planetary gear mechanism (19) is a sunwheel, the second element (45) is a planetary carrier and the third element (46) is a ring gear, the sunwheel (44) and the rotor (18) of the electric machine (15) being seated on a common hollow shaft.

4. The all-wheel drive vehicle with hybrid drive as claimed in claim 1, wherein the electric machine (15) and the planetary gear mechanism (19) are accommodated in a common housing (16) to which in each case one clutch (20, 21) is connected on each side.

5. The all-wheel drive vehicle with hybrid drive as claimed in claim 1, wherein the first drive train (4) leads to a permanently driven front axle (2) and the second drive train (10) leads to the second driven axle (3) via an articulated shaft (9), and wherein the electric machine (15) is arranged between the articulated shaft (9) and an axle transmission (8) of the second driven axle (3).

6. The all-wheel drive vehicle with hybrid drive as claimed in claim 5, wherein the electric machine (15) with the planetary gear mechanism (19) and the clutches (20, 21) directly adjoins the axle transmission (8) and their housings are connected to one another.

7. The all-wheel drive vehicle with hybrid drive as claimed in claim 5, wherein the first driven axle (2) has an axle transmission (4) and two half axles (5, 6) which lead to wheels, and wherein a third clutch (30) is provided in one of the two half axles (5: 6).

8. The all-wheel drive vehicle with hybrid drive as claimed in claim 1, wherein at least one of the clutches (20, 21, 30) is synchronized.

* * * * *